(12) United States Patent
Nitsch

(10) Patent No.: US 7,257,077 B2
(45) Date of Patent: Aug. 14, 2007

(54) PROCEDURE FOR THE RECOGNITION OF ACTIVE CODE SEQUENCES

(75) Inventor: Bernhard Nitsch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1077 days.

(21) Appl. No.: 10/210,810

(22) Filed: Aug. 1, 2002

(65) Prior Publication Data
US 2003/0053490 A1    Mar. 20, 2003

(30) Foreign Application Priority Data
Aug. 8, 2001    (DE)    ................................. 101 38 962

(51) Int. Cl.
*H04J 11/00*    (2006.01)
*H04J 13/00*    (2006.01)

(52) U.S. Cl. ...................................... 370/203; 370/335

(58) Field of Classification Search ................ 370/203, 370/310, 335, 441, 529
See application file for complete search history.

(56) References Cited

U.S. PATENT DOCUMENTS 6,795,417 B2 * 9/2004 Zeira et al. .................. 370/335
6,816,470 B2 * 11/2004 Kim et al. .................... 370/280
6,885,654 B2 * 4/2005 Pan et al. ..................... 370/342
2002/0054583 A1 * 5/2002 Olesen et al. ................ 370/336
2002/0131383 A1 * 9/2002 De et al. ...................... 370/335

FOREIGN PATENT DOCUMENTS

DE    197 57 630 A1    9/1998

OTHER PUBLICATIONS

JOOS, "Lehrbuch der Theoretischen Physik" pp. 69-73 and 105-110 (1959).

* cited by examiner

*Primary Examiner*—Chau Nguyen
*Assistant Examiner*—Marcus R Smith
(74) *Attorney, Agent, or Firm*—Caesar, Rivise, Bernstein, Cohen & Pokotilow, Ltd.

(57) ABSTRACT

A procedure for determining active code sequences of a plurality of overlaid code sequences ($c_a(v) \cdot g_a$), wherein the active code sequences have a greater gain factor ($g_a$) than the inactive code sequences, includes: (1) formation of a cost function (L) dependent upon unknown estimated values ($\tilde{g}_a, \hat{g}_a$) of the gain factors ($g_a$) of composite code sequences ($c_a(v) \cdot g_a$), (2) partial differentiation of the cost function (L) in accord with the unknown estimated values ($\tilde{g}_a, \hat{g}_a$) of the gain factors ($g_a$), (3) formation of an equation system from the presupposition that all partial differentials of the cost function (L) are zero and a minimum of the cost function (L) is present, (4) determination of the estimated values ($\tilde{g}, \hat{g}_a$) of the gain factors ($g_a$) by solving the equation system, and (5) determining that an active code sequence exists, if the estimated values ($\tilde{g}_a, \hat{g}_a$) of the corresponding gain factors ($g_a$) are greater than a specified threshold value.

8 Claims, 1 Drawing Sheet

PROCEDURE FOR THE RECOGNITION OF ACTIVE CODE SEQUENCES

BACKGROUND OF THE INVENTION

The invention concerns a procedure for the determination of active code sequences, in particular, of identification sequences (midambles) in mobile radio systems, especially for the TDD-Mode of the Standards 3GPP.

The employment of Time Division Duplex (TDD) for the uplink (connection of the mobile station to the base station) and the downlink (connection of the base station to the mobile station) for various mobile radio standards has been made known, for example, by T. Ojanperä, R. Prasad "Wideband CDMA for Third Generation Mobile Communications", Artech House, 1998, ISBN 0-89006-735-X, Pages 261 to 277. Therein, a TDD Modus is presented, in which each downlink and uplink slot of the TDD framework is split up into a plurality of code channels with an orthogonal spreading code. Each code channel comprises a first data zone, a second data zone and an identification sequence (midamble) placed between the said data zones. Although the data chip sequences, because of multiplication with orthogonal spreading codes, are orthogonal to one another, the identification sequences (midambles) are not orthogonal to each other.

In certain operational situations checks must be made, to see which identification sequences (midambles) are active. Fundamentally, this could be done by correlation of the received data sequence in the midamble area, inclusive of all allowable midambles (identification sequences). By the squaring of the correlation-coefficients, a capacity centered evaluation can be achieved. If the square of a defined correlation coefficient, in relation to the entire capacity of the sum of the midambles oversteps in a logarithmic scale a certain threshold, then the conclusion could rest on an active midamble, and hence on an active code channel. This procedure adapts itself, however, only to the detection of the active midambles, providing that the midamble-code-sequences exhibit a satisfactory cross-correlation characteristic. In the case of short midamble-code-sequences and a high degree of disturbance, then, because of the poor cross correlation characteristics, erroneous or failed detection comes to the fore, because no clear-cut threshold can be found, which separates a valid hypothesis from a faulty hypothesis.

All references cited herein are incorporated herein by reference in their entireties.

BRIEF SUMMARY OF THE INVENTION

Thus the invention has the purpose of creating a procedure for the recognition of code sequences along with a corresponding computer program, which operates with a high degree of reliability, even in the case of small signal/noise relationships and poor cross correlation characteristics of the to-be-recognized code signals.

The basis of the invention is the recognition, that by means of the establishment of a cost-function and the partial differentiation after the gain factors of the individual code sequences a particularly secure procedure for the detection of the active code sequences can be created.

It is particularly of advantage to compute and to store, on a one-time basis, the matrix of the equation systems, which arises from the partial differentiation of the cost-function. Meanwhile, the actual detection procedure, in that case, can then be referred back onto these previously computed and saved coefficients, so that the invented procedure, with a relatively small investment in implementation, can be accomplished with a relatively small time spent in computation.

BRIEF DESCRIPTION OF SEVERAL VIEWS OF THE DRAWINGS

In the following, an embodiment of the invention will be more closely described with the aid of the drawings, wherein.

DETAILED DESCRIPTION OF THE INVENTION

Figure 1:
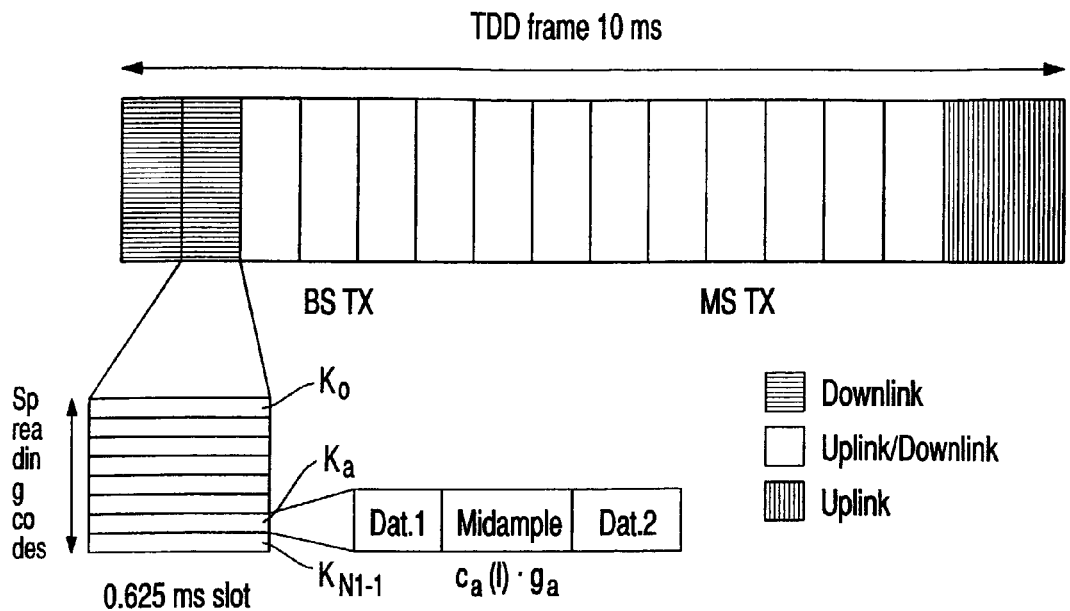
FIG. 1 is a TDD framework of the ESTI wideband-CDMA TDD mode, in which the invented procedure can be applied.

FIG. 1 shows a TDD-framework of the ETSI (European Telecommunications Standards Institute) wideband—CDMA (Code Division Multiple Access) TDD (Time Division Duplex) mode, whereby, with the aid of FIG. 1, an application example of the invented procedure can be explained. The application of the invented procedure is, however, not only for the TDD-mode by a mobile radio system, but entirely generally applicable for the recognition of code signals with little signal/noise ratio.

In the case of the TDD-Mode, different time slots of the TDD-frame are used for the down-link (connection between base station BS and the mobile station MS) and the up-link (connection between the mobile station MS and the base station BS) in a time-multiplex process. In the exemplary schematic presented in FIG. 1, some slots are continually in the down-link, other slots are placed continually in up-link service, while a plurality of slots are variable and can be assigned to the up-link (MS TX) and down-link (BS TX). Each slot arrays itself in different code channels $K_o$ to $K_{N1-1}$. Each code channel comprises a first data area Dat.1 and a second data area Dat.2 and an identification sequence placed between the said data areas, which, hereafter will be referred to as "midamble". Each code channel $K_a$ can be assigned to a different midamble $C_a(1) \cdot g_a$, whereby Ca(1) denotes the code sequence of the midamble and $g_a$ stands for the gain factor. Then, according to whether the corresponding code channel $K_a$ is active, then also its dedicated midamble is active, that is, for active code channels where $g_a > 0$ is valid. Conversely, for non-active code channels the valid expression is $g_a = 0$.

Since, in the data areas Dat.1 and Dat.2, the data symbols with orthogonal spreading codes are multiplied and the chip sequences, on this account, are also orthogonal, the code sequences of the midambles of the various code channels, namely, $K_o$ to $K_{N1-1}$ are not orthogonal.

In certain operational situations, the determination must be made, as to which midambles are active and which midambles are not active. To this purpose, the present invention can be utilized, which will be described and explained below.

Figure 2:
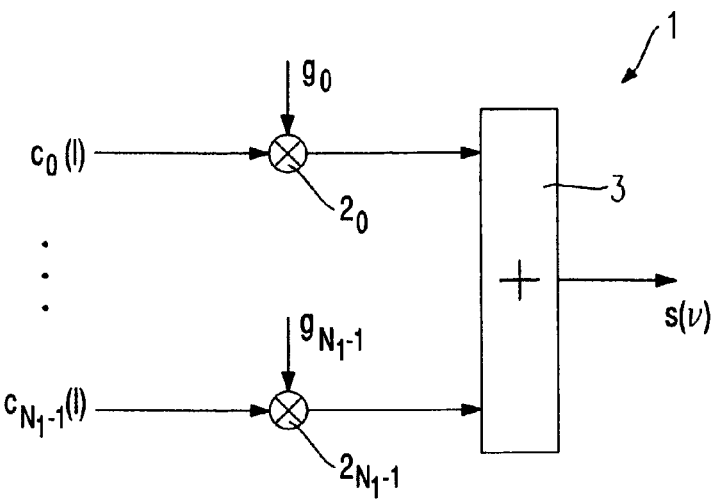
FIG. 2 is a model of the sender based on the invented, procedure.

In the description hereafter, the following formula symbols will be used:

v time index on the chip surface $c_{a(v)}$ normalized capacity, descrambled, non-deformed chip signal of the a-ten midamble code $g_a$ gain factor of the a-ten midamble code
$\check{g}_a$, $\tilde{g}_a$, $\hat{g}_a$ and the estimated gain factor of the a-ten midamble code
j square root of −1
M relative capacity threshold
n(v) additive disturbance
N length of the midamble code
$N_1$ number of the midamble codes
r(v) measurement signal
REAL{ ... } real (built-in) function
s(v) reference signal In FIG. 2 is schematically shown a block circuit diagram of a representation, in keeping with the invented procedure, of the sender 1. The undistorted midamble codes $c_a(v)$ are multiplied by the gain factors $g_a$ and summarized in an adding device 3 and transmitted in parallel. The codes of the midambles $c_a(v)$ are, in general not orthogonal.

Figure 3:
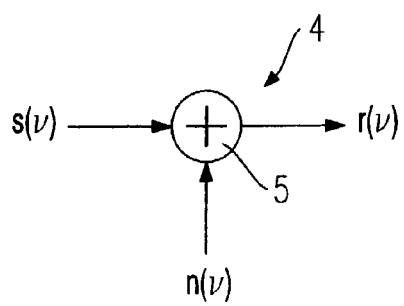
FIG. 3 is a model of the transmission channel, said model being based on the invented procedure.

The representation of the transmission channel 4, which is in agreement with the invented procedure, as it is presented schematically in FIG. 3, takes into consideration an additive disturbance n(v), which, in adding device 5 overlays the referring signal and biases the measurement signal r(v).

The invented procedure for the detection of the midambles uses a common maximum favorable probability estimation, which employs the following cost function:

$$L(\tilde{g}_a) = \sum_{v=0}^{N-1} \left| r(v) - \sum_a \tilde{g}_a \cdot c_a(v) \right|^2, \quad (1)$$

in order to estimate the gain factors of the midambles. In this equation, r(v) is the measurement signal, $c_a(v)$ is the complex, capacity normed, undistorted signal of the a-ten midamble and $g_a$ is the gain factor of the a-ten midamble. Also, $\tilde{g}_a$ denotes the trial value of the gain factor $g_a$.

For the calculation of the partial differentiation of the cost function in accord with the unknown parameters, the following formality is employed: an unknown parameter x is a real number, the constants c and d are complex numbers and a general cost function $$L = |c \cdot x + d|^2 = (c \cdot x + d) \cdot (c \cdot x + d)^* = |c|^2 \cdot x^2 + c^* \cdot d \cdot x + c \cdot d^* \cdot x + |d|^2 \quad (2)$$

employs the square of the amount. Then, the partial derivative can be computed in this manner:

$$\frac{\partial L}{\partial x} = 2 \cdot |c|^2 \cdot x + 2 \cdot \text{REAL}\{c \cdot d^*\}. \quad (3)$$

Having equation (3), a partial differentiation will yield, in accord with the estimated value $\hat{g}_a$ of the gain factors of the midambles:

$$\frac{\partial L}{\partial \hat{g}_a} = 2 \sum_{v=0}^{N-1} |c_a(v)|^2 \cdot \hat{g}_a + 2 \sum_{v=0}^{N-1} \text{REAL}\{-c_a(v) \cdot a_3^*(v)\} = 0 \quad (4)$$

with $$a_3(v) = r(v) - \sum_{\mu \neq a} \tilde{g}_\mu \cdot c_\mu(v). \quad (5)$$

The equations (4, 5) can be condensed into a matrix-vector mode, giving:

$$[A_{a,\mu}] \cdot [\hat{g}_\mu] = [b_a] \quad (6)$$

whereby the coefficients of the lines reduce themselves to:

$$b_a = \sum_v \text{REAL}\{c_a(v) \cdot r^*(v)\} \quad (7)$$

$$A_{a,\mu} = \sum_v \text{REAL}\{c_a(v) \cdot c_\mu^*(v)\} \quad (8)$$

If the linear equation is solved, then the sought for optimal estimated value $\hat{g}_a$ of the gain factors $g_a$ becomes known.

Using then, as a starting point, the estimated value $\tilde{g}_a$ of the midambles, the entire capacity of the midambles can be approximated by $$\hat{P}_{Midamble} = \sum_a (\hat{g}_a)^2 \quad (9)$$

If the capacity of a midamble code oversteps $$10 \log_{10} \frac{\hat{g}_a^2}{\hat{P}_{Midamble}} > M \quad (10)$$

the above relative, logarithmic capacity threshold M, then the midamble code is classified as an active midamble code.

The probability of detection of error in the procedure presented here is clearly much less, in comparison to a simple correlation procedure.

The greatest expenditure of time and effort in the procedure lies in the computation of the correlation coefficients $b_a$ between the undeformed midamble codes and the measurement signal according to the equation (8). For the solving of the equation system, the coefficients of the inverse matrix $A^{-1}$ can be computed ahead of time and stored in memory. For this operation, one requires, for the solving of the equation system one needs only the second power of the number $N_1$ of the midamble codes operations. The numerical complexity of the presented procedure is also, in comparison to the simple correlation procedure, only a slight bit greater, in case the number $N_1$ of the midamble codes in comparison to the length N of the midamble codes is too small.

While the invention has been described in detail and with reference to specific examples thereof, it will be apparent to one skilled in the art that various changes and modifications can be made therein without departing from the spirit and scope thereof.

What is claimed is:

1. A process for recognizing active code sequences in mobile radio systems amongst a plurality of combined code sequences ($c_a(v) \cdot g_a$) to minimize erroneous or failed detection from inactive code sequences, wherein the active code sequences exhibit greater gain factors ($g_a$) than do the inactive code sequences, the process comprising:
    receiving the combined code sequences;
    forming a cost function (L) dependent upon unknown but estimated values ($\tilde{g}_a$, $\hat{g}_a$) of the gain factors ($g_a$) of the combined code sequences ($c_a(v) \cdot g_a$);

partially differentiating the cost function (L) in accord with the unknown estimated values ($\tilde{g}_a$, $\hat{g}_a$) of the gain factors ($g_a$);

forming a correlation system from an assumption that all partial differentiations of the cost function (L) are zero and thus a minimum of the cost function (L) exists;

determining optimal estimated values ($\tilde{g}_a$, $\hat{g}_a$) of the gain factors ($g_a$) by solving equation systems;

storing the optimal estimated values ($\tilde{g}_a$, $\hat{g}_a$);

comparing the saved optimal estimated values ($\tilde{g}_a$, $\hat{g}_a$) of the corresponding gain factors ($g_a$) to a specified threshold;

classifying any of the received combined code sequences as active code sequences when the saved optimal estimated values ($\tilde{g}_a$, $\hat{g}_a$) of the corresponding gain factors ($g_a$) are greater than the specified thresholds; and conveying the classified active code sequences from the combined code sequences for communication based on data areas corresponding to only the classified active code sequences and thus minimizing erroneous or failed detection from inactive code sequences.

2. The process of claim 1, wherein the cost function (L) is linearized by series development before the partial differentiation.

3. The process of claim 2, wherein the cost function L is $$L(\tilde{g}_a) = \sum_{v=0}^{N-1} \left| r(v) - \sum_a \tilde{g}_a \cdot c_a(v) \right|^2,$$

where r(v) is a composite signal subjected to a disturbing signal of a code sequence $c_a(v) \cdot g_a$, $g_a$ is a gain factor of a-ten code sequences $c_a(v) \cdot g_a$, $c_a(v)$ is a normalized code sequence on the gain factor $g_a=1$, and $\tilde{g}_a$ is the unknown estimated value of the gain factor $g_a$ of the a-ten code sequences $c_a(v) \cdot g_a$.

4. The process of claim 3, wherein by means of partial differentiation of the linearized cost function L in accord with the unknown estimated values $\hat{g}_a$ the gain factor $g_a$ the equation system to be solved $$[A_{a,\mu}] \cdot [\hat{g}_a] = [b_a]$$

is obtained, wherein the coefficients of the equation system are:

$$b_a = \sum_v \text{REAL}\{c_a(v) \cdot r^*(v)\}$$

$$A_{a,\mu} = \sum_v \text{REAL}\{c_a(v) \cdot c_\mu^*(v)\}.$$

5. The process of claim 4, wherein the coefficients $$A_{a,\mu} = \sum_v \text{REAL}\{c_a(v) \cdot c_\mu^*(v)\}$$

are only computed once and stored, and each carrying out of the computation can be employed based on the stored coefficients.

6. The process of claim 1, wherein the estimated values of $\hat{g}_a$ of the gain factors $g_a$ obtained by the solution of the equation system are squared and the sum squares $$\hat{P}_{Midamble} = \sum_a (\hat{g}_a)^2$$

is formed, whereby an active code sequence is determined, provided that $$10\log_{10} \frac{\hat{g}_a^2}{\hat{P}_{Midamble}} > M$$

is valid, wherein M is a given threshold value.

7. The process of claim 1, wherein the code sequences ($C_a(v) \cdot g_a$) are identification sequences of a code channel of a CDMA-mobile radio system.

8. A computer program with a programmed code stored on a computer readable medium, wherein the program executes the process of claim 1 when the program is run in a computer.

* * * * *